UNITED STATES PATENT OFFICE.

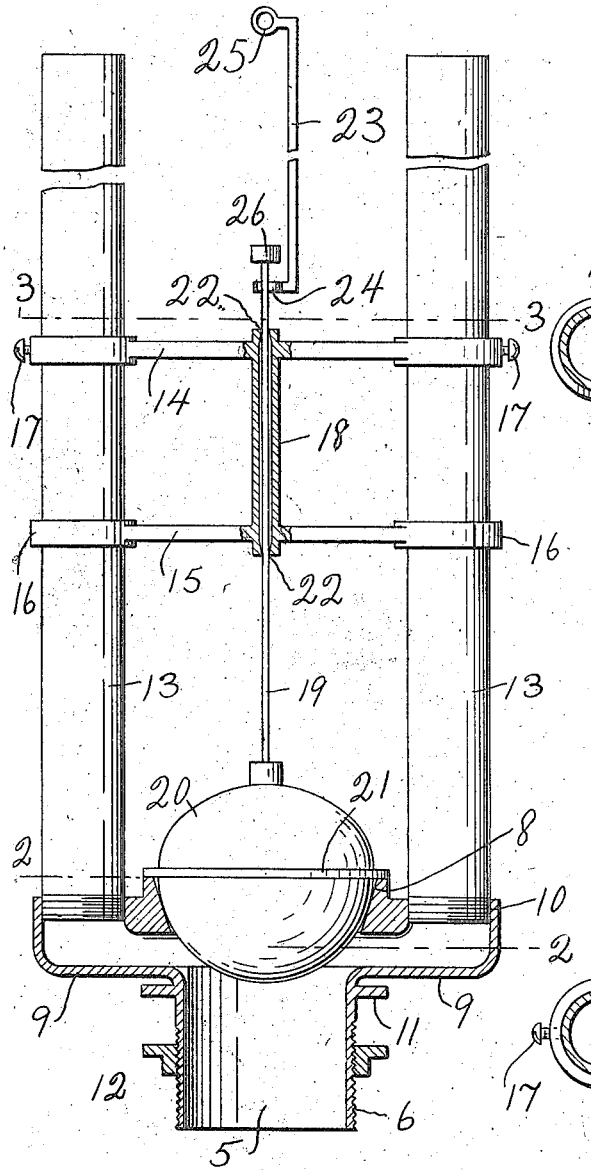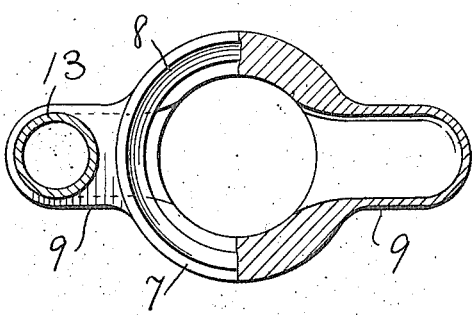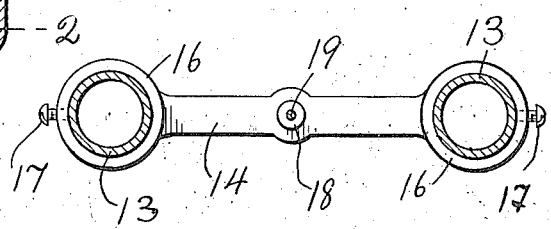

LLOYD C. VADER, OF GREENWICH, CONNECTICUT.

FLUSH-VALVE.

1,145,635.   Specification of Letters Patent.   Patented July 6, 1915.

Application filed February 19, 1915. Serial No. 9,350.

*To all whom it may concern:*

Be it known that I, LLOYD C. VADER, a citizen of the United States, residing at Greenwich, in the county of Fairfield and State of Connecticut, have invented certain new and useful Improvements in Flush-Valves, of which the following is a specification, reference being had to the accompanying drawings.

This invention relates to flush valves, and has for its primary object to provide a valve of this type for water closet flush tanks, whereby a quick and thorough flushing of the bowl may be obtained with the use of a minimum quantity of water.

A more specific object of the invention is to provide a flushing valve including a fitting having an outlet and spaced overflow pipes connected thereto, a valve member normally closing the outlet, and guiding means for the valve member mounted upon the overflow pipes which will absolutely insure the vertical movement of said member in axial alinement with the outlet opening.

It is a further object of the invention to provide a valve for flush tanks wherein the counteracting air pressure is quickly relieved when the valve is raised so as to permit of an immediate and copious flow of the water, the mounting of the valve being of such simplicity that the valve member may be readily replaced by a new one when necessary, without necessitating the employment of a skilled plumber.

With the above and other objects in view, my invention consists in the novel features of construction, combination, and arrangement of parts to be hereinafter more fully described, claimed, and illustrated in the accompanying drawings, in which, Figure 1 is a side elevation, partly in section, of my improved flushing valve; Fig. 2 is a horizontal section taken on the line 2—2 of Fig. 1; and Fig. 3 is a section taken on the line 3—3 of Fig. 1.

Referring in detail to the drawing, 5 designates the pipe fitting, the body of which is formed with an exteriorly threaded nipple 6 for engagement with the female coupling member which is provided upon the inlet opening of the bowl, (not shown). The cylindrical body 7 of the fitting is formed with a downwardly and inwardly tapering valve seat 8, and upon opposite sides of said body, the laterally projecting tubular extensions 9 are integrally formed, said extensions being turned upwardly and interiorly threaded, as at 10. Upon the nipple 6, at its juncture with the body of the fitting, an exterior annular flange 11 is formed, and upon the threaded nipple, an adjustable collar 12 is engaged. The fitting 5 is produced in the form of a single integral casting, thereby conducing to economy in the manufacture of the device.

The lower ends of upright overflow tubes or pipes 13 are engaged with the interior threads 10 of the extensions 9 on the fitting and have their upper open ends disposed above the normal water level in the flow tank. A pair of horizontal bars, indicated at 14 and 15, are provided with integral sleeves or collars 16 upon their ends for engagement upon the pipes 13. The collars 16 on the upper horizontal bar 14 carry the set screws 17, whereby the spaced bars may be rigidly secured in position upon the overflow pipes. The bars 14 and 15 are each further provided with an integral vertical guide tube 18.

19 designates the rod of the flushing valve which extends loosely through this tube and is provided upon its lower end with the usual neck extension having a bushing to receive the threaded lower end of the rod 19. This valve ball is formed upon its periphery with an annular rib or flange 21 for engagement with the circumscribing upper edge of the valve seat 8. It will be observed, from reference to Fig. 1, that the bore of the guide tube 18 is of appreciably greater diameter than the diameter of the valve rod 19. At opposite ends of this guide tube, the bore thereof is contracted or gradually reduced in diameter, as indicated at 22, so as to closely surround the valve rod 19, but yet permit of the free vertical sliding movement thereof. The upper end of the valve rod extends through a ring or eye 24 formed upon the lower end of a lifting rod 23, the upper end of said rod being also provided with the eye 25 to which an operating lever or chain is attached in the usual manner. Above the eye 24, the valve rod 19 is provided upon its upper end with a cylindrical nut or head 26 which is of greater diameter than the ring 24. This ring, however, is of such diameter with respect to the rod 19 as to provide a very loose connection between the lifting rod and the valve rod so that the latter may slide freely without binding upon the eye 24.

Assuming that the valve ball 20 is in its closed position, as shown in Fig. 1, when the same is lifted from the valve seat 8, the pressure of the air is relieved, the same passing through the tubular extensions 9 communicating with the fitting below the valve seat at opposite sides and upwardly through the overflow pipes 13. The water in the tank may thus immediately and freely flow downwardly over the valve seat and through the nipple of the fitting into the bowl. When the water has run out of the tank, the valve ball 20 will again descend upon the valve seat.

The two points of contact at the upper and lower ends of the guide tube 18 with the valve rod, positively assure the proper seating of the valve ball, as said rod is absolutely maintained in axial alinement with the longitudinal center of the valve seat. Thus, lateral displacement of the valve ball is overcome so that there will be no leakage of the water around the valve after the same has returned to its closed position. It will also be apparent that friction upon the valve rod is reduced to a minimum, so that it will not quickly wear and thus be liable to an oscillatory movement in the guide. By the provision of the twin overflow pipes 13, the air pressure beneath the valve seat which has a tendency to retard the flow of the water, is immediately relieved upon a lifting of the valve. Thus I obtain, by means of my improved valve construction, an instant and thorough flushing of the bowl immediately upon the raising of the valve ball. The several parts of the device are also of extremely simple form, and it will, therefore, be appreciated that the valve is not liable to get out of order. The rubber valve ball will properly perform its function for a number of years, and may be readily replaced when necessary, without requiring the services of an experienced plumber.

While I have above described the preferred form and construction of the several elements employed, it will be understood that the invention is susceptible of considerable modification therein and I, therefore, reserve the privilege of resorting to all such legitimate changes as may be fairly embodied within the spirit and scope of the invention as claimed.

Having thus fully described my invention, what I desire to claim and secure by Letters Patent is:—

1. A flush valve including a fitting having an outlet and a valve seat at one end thereof, said fitting being provided with laterally extending upwardly opening ports below the valve seat and in the opposite sides thereof, overflow pipes connected at their lower ends to said ports, rigidly connected spaced parallel brace bars provided with means on their extremities for detachable engagement upon the overflow pipes to provide a brace between said pipes, said brace being centrally provided with a vertically disposed guide, and a valve normally engaged upon said valve seat and closing the outlet, said valve being provided with a rod vertically slidable through said guide.

2. A flush valve including a fitting having an outlet and a valve seat at one end thereof, said fitting being provided with laterally extending upwardly opening ports below the valve seat and at opposite sides thereof, overflow pipes detachably fitted at their lower ends in said ports, spaced horizontal bars mounted at their ends upon the spaced overflow pipes, and constituting a double brace between the same, a valve normally engaged upon said seat and closing the outlet, said valve being provided with a vertically disposed rod, and a vertical guide tube integrally formed at its ends with said horizontal bars and having a bore to receive the valve rod which is of relatively great diameter, said bore at the upper and lower ends of the guide tube being gradually contracted or reduced in diameter to closely surround the valve rod.

In testimony whereof I hereunto affix my signature in the presence of two witnesses.

LLOYD C. VADER.

Witnesses:
JOSEPH I. JOHNSTON,
JAMES SHERIDAN.